(12) United States Patent
Lee

(10) Patent No.: US 9,393,999 B2
(45) Date of Patent: Jul. 19, 2016

(54) VEHICLE MOVEMENT PATH SYSTEM AND METHOD FOR VEHICLE

(71) Applicant: HYUNDAI MOBIS CO., LTD., Seoul (KR)

(72) Inventor: Seong Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/938,759

(22) Filed: Nov. 11, 2015

(65) Prior Publication Data

US 2016/0059890 A1  Mar. 3, 2016

Related U.S. Application Data

(63) Continuation of application No. 14/269,344, filed on May 5, 2014, now Pat. No. 9,187,125.

(30) Foreign Application Priority Data

Nov. 21, 2013  (KR) .......................... 10-2013-0141998

(51) Int. Cl.
*B62D 6/00* (2006.01)
*B62D 15/02* (2006.01)
(Continued)

(52) U.S. Cl.
CPC ............... *B62D 15/027* (2013.01); *B60R 1/00* (2013.01); *B62D 15/028* (2013.01); *B62D 15/0285* (2013.01); *G01C 21/20* (2013.01);
(Continued)

(58) Field of Classification Search
CPC .......... B62D 15/027; G01C 21/20; G08G 1/14
See application file for complete search history.

(56) References Cited

U.S. PATENT DOCUMENTS 6,212,452 B1 * 4/2001 Shimizu ................. B62D 1/286
180/168
6,370,262 B1 * 4/2002 Kawabata ............. G06T 7/0075
382/106

(Continued)

FOREIGN PATENT DOCUMENTS

KR  10-2012-0086576 A  8/2012
KR  10-2013-0021102 A  3/2013
(Continued)

OTHER PUBLICATIONS

Office Action dated Nov. 17, 2014 of corresponding Korean Patent Application No. 10-2013-0141998 in 5 pages.

*Primary Examiner* — Calvin Cheung
(74) *Attorney, Agent, or Firm* — Knobbe, Martens, Olson & Bear, LLP

(57) ABSTRACT

Disclosed is a vehicle movement path system and method for a vehicle. The vehicle movement path system includes: a camera input configured to receive at least one photographic image from a camera installed in the vehicle; at least one module configured to analyze the photographic image to identify a line marked on a road, compute an angle between the line and an axis of the vehicle, compute a distance between the line and a point associated with the vehicle, and generate, using the computed angle and the computed distance, a movement path along which to move the vehicle; and a movement path output configured to output the movement path to the vehicle such that the vehicle automatically steers itself using the movement path or provides a driver with guidance to move the vehicle along the movement path.

22 Claims, 5 Drawing Sheets

(51) Int. Cl.
  *G01C 21/20* (2006.01)
  *G08G 1/14* (2006.01)
  *B60R 1/00* (2006.01)
  *G08G 1/16* (2006.01)

(52) U.S. Cl.
  CPC ............... *G08G 1/14* (2013.01); *G08G 1/168* (2013.01); *B60R 2300/607* (2013.01); *B60R 2300/806* (2013.01)

(56) References Cited

U.S. PATENT DOCUMENTS

| | | | |
|---|---|---|---|
| 6,611,744 B1* | 8/2003 | Shimazaki | B60R 1/00 180/168 |
| 6,950,035 B2* | 9/2005 | Tanaka | B60Q 9/004 340/435 |
| 6,999,002 B2 | 2/2006 | Mizusawa et al. | |
| 7,069,128 B2 | 6/2006 | Iwama | |
| 8,248,220 B2 | 8/2012 | Nagamine et al. | |
| 2002/0005779 A1 | 1/2002 | Ishii et al. | |
| 2002/0041239 A1* | 4/2002 | Shimizu | B60R 1/00 340/932.2 |
| 2004/0257244 A1* | 12/2004 | Kubota | B62D 15/0285 340/932.2 |
| 2004/0267420 A1* | 12/2004 | Tanaka | B62D 15/0285 701/36 |
| 2005/0209748 A1* | 9/2005 | Watanabe | G06K 9/00798 701/23 |
| 2006/0190147 A1 | 8/2006 | Lee et al. | |
| 2007/0057816 A1 | 3/2007 | Sakakibara et al. | |
| 2009/0143967 A1 | 6/2009 | Lee et al. | |
| 2009/0251334 A1* | 10/2009 | Yoshihashi | B60W 50/14 340/932.2 |
| 2009/0268948 A1* | 10/2009 | Zhang | G06K 9/00798 382/104 |
| 2009/0278709 A1 | 11/2009 | Endo et al. | |
| 2009/0303080 A1 | 12/2009 | Kadowaki et al. | |
| 2010/0019934 A1* | 1/2010 | Takano | B60R 1/00 340/932.2 |
| 2010/0033348 A1 | 2/2010 | Kawabata et al. | |
| 2010/0049401 A1* | 2/2010 | Watanabe | B60R 1/00 701/41 |
| 2010/0049402 A1 | 2/2010 | Tanaka | |
| 2010/0231417 A1 | 9/2010 | Kadowaki et al. | |
| 2010/0235053 A1 | 9/2010 | Iwakiri et al. | |
| 2010/0274446 A1 | 10/2010 | Sasajima et al. | |
| 2011/0013019 A1 | 1/2011 | Yamanaka et al. | |
| 2011/0102579 A1* | 5/2011 | Sung | G06K 9/00798 348/135 |
| 2011/0181441 A1 | 7/2011 | Ma et al. | |
| 2011/0276225 A1 | 11/2011 | Nefcy et al. | |
| 2012/0169875 A1 | 7/2012 | Matsukawa et al. | |
| 2013/0073119 A1 | 3/2013 | Huger et al. | |
| 2014/0347195 A1 | 11/2014 | Stempnik et al. | |
| 2015/0336607 A1* | 11/2015 | Inoue | B60W 40/114 701/41 |

FOREIGN PATENT DOCUMENTS

| | | |
|---|---|---|
| KR | 10-2013-0112550 A | 10/2013 |
| WO | 2013/110116 A1 | 8/2013 |

* cited by examiner

100

(a)

(b)

(c)

(d)

(e)

VEHICLE MOVEMENT PATH SYSTEM AND METHOD FOR VEHICLE

CROSS-REFERENCE TO RELATED APPLICATION

Any and all applications for which a foreign or domestic priority claim is identified in the Application Data Sheet as filed with the present application are hereby incorporated by reference under 37 CFR 1.57.

TECHNICAL FIELD

The present disclosure relates to a vehicle movement path system and method, which guide and assist a user operation of a steering wheel.

BACKGROUND

A parking assistance system, which is a system for helping a driver to more easily and conveniently park a vehicle, recognizes a parking space through a sensor mounted in a vehicle, calculates an optimum path, through which the vehicle may be parked within the recognized parking space, and automatically controls a steering wheel or assists driver's operation of a steering wheel by an audio-visual method.

As one example of the parking assistance system, a parking assistance system based on an ultrasonic wave sensor appears, and the parking assistance system based on the ultrasonic wave sensor recognizes a surrounding obstacle and a parking space through the ultrasonic wave sensor and generates a movement path of a vehicle. However, in the case where an obstacle is not present, there is a disadvantage in that it is difficult for the parking assistance system based on the ultrasonic wave sensor to recognize a parking space, and the parking assistance system based on the ultrasonic wave sensor is influenced by an obstacle disposition state around the parking space (for example, in the case where a next vehicle is parked to be misaligned to a parking line), and thus a parking assistance system based on a camera image has been recently considered.

However, even though the parking assistance system is based on any one of the ultrasonic wave sensor, the camera, and the like, in order to have an effective detection range and recognize an accurate parking space, a vehicle needs to be disposed at an appropriate position in a parking space and the like. That is, when the system is operated at a position which is spaced apart too far from a parking line or a parking space, the system gets out of the effective detection range or has degraded detection accuracy, so that it is difficult to reliably recognize a parking space and guide the parking. The aforementioned problem causes inconvenience in that the system is not operated or recognition performance deteriorates even though a user, who is not accustomed to use the parking assistance system, approaches close to a parking line.

SUMMARY

The present invention has been made in an effort to provide a vehicle movement path system and method for a vehicle, which may more reliably recognize a line marked on the street and guide movement of the vehicle.

An aspect of the present invention provides a vehicle movement path system (also referred to as vehicle movement assistance system) for a vehicle, the system comprising: a camera input configured to receive at least one photographic image from a camera installed in the vehicle; at least one module configured to analyze the at least one photographic image to identify a line marked on a road, compute an angle between the line and an axis of the vehicle, compute a distance between the line and a point associated with the vehicle, and generate, using the computed angle and the computed distance, a movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween; and a movement path output configured to output the movement path to the vehicle such that the vehicle automatically steers itself using the movement path or provides a driver with guidance to move the vehicle along the movement path.

The vehicle movement path system of the preceding paragraph can have any sub-combination of the following features: wherein the axis is a longitudinal axis of the vehicle, wherein the predetermined target angle is zero; wherein the point associated with the vehicle is on a side of the vehicle facing the line marked on the road; wherein the axis is a longitudinal axis of the vehicle, wherein the point associated with the vehicle is located generally in the middle along the axis; wherein the vehicle movement path system is configured to identify the line by a method comprising synthesizing a view using the at least one photographic image, processing the view to locate a plurality of candidate points on the view, and conducting a line fitting process for at least part of the plurality of candidate points to identify the line; wherein the at least one module is further configured to recognize space from at least one surrounding obstacle and to generate the movement path in view of the recognized space; and further comprising a sensor input configured to receive ultrasonic wave signals, wherein the at least one module is further configured to recognize space from at least one surrounding obstacle based on the ultrasonic wave signals.

Another aspect of the present invention provides a vehicle comprising: at least one camera installed in the vehicle and configured to capture at least one photographic image of surroundings of the vehicle; and the vehicle movement path system of the preceding paragraphs.

Another aspect of the present invention provides a method of moving a vehicle comprising: providing the vehicle of the preceding paragraph; running the vehicle movement path system of the preceding paragraph; and moving the vehicle in accordance with the movement path.

Another aspect of the present invention provides a method of generating a vehicle movement path, the method comprising: providing the vehicle movement path system of the preceding paragraphs installed in a vehicle; analyzing the at least one photographic image to identify a line marked on a road; computing an angle between the line and an axis of the vehicle; computing a distance between the line and a point associated with the vehicle; generating, using the computed angle and the computed distance, a movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween; and outputting the movement path to the vehicle such that the vehicle automatically steers itself using the movement path or provides a driver with guidance to move the vehicle along the movement path. In the method, the axis may be a longitudinal axis of the vehicle, wherein the predetermined target angle is zero, wherein the point associated with the vehicle is on a side of the vehicle facing the line marked on the road, wherein the point associated with the vehicle is located generally in the middle along the axis Another aspect of the present invention provides a system for a vehicle, including: an image composition unit configured to generate a composed image in a form of a top view or an around view; a line detection unit configured to detect a line through image-processing of the composed image; a distance and inclination calculation unit configured to calculate a distance and an inclination between the detected line and the vehicle; and a movement path generation unit configured to generate a movement path for deposing the vehicle at an initial position, the initial position being set to a position at which the detected line is parallel to a longitudinal center axis of the vehicle, and the detected line and the vehicle are spaced apart from each other by a predetermined interval.

Another aspect of the present invention provides a method for a vehicle, including: a composed image obtainment operation of generating a composed image in a form of a top view or an around view from an image photographed by a plurality of cameras; a line detection operation of detecting a line based on the composed image; a distance and inclination calculation operation of calculating a distance and an inclination between the detected line and the vehicle; a movement path generation operation of generating a movement path for disposing the vehicle at an initial position, the initial position being set considering an effective detection range or detection accuracy of an ultrasonic wave sensor or a camera mounted in the vehicle; and a movement assistance operation of controlling driving of a steering wheel of the vehicle according along the generated movement path, or guiding a user operation of the steering wheel through an audio-visual means.

According to the systems and methods according to some embodiments of the present disclosure, the vehicle may be moved to and disposed at a predetermined initial position considering an effective detection range or detection accuracy of the ultrasonic wave sensor and the like. Accordingly, it is possible to more accurately and reliably recognize a parking space.

The systems and methods according to some embodiments of the present disclosure may automatically control a movement of the vehicle or guide the movement of the vehicle to a user from an initial stage before recognizing the parking space, thereby enabling the user to more easily and conveniently receive parking assistance or guide.

DETAILED DESCRIPTION OF EMBODIMENTS

Hereinafter, embodiments of the present invention will be described with reference to the accompanying drawings. However, the embodiments below are provided to help understand the present invention, and the scope of the present invention is not limited to the embodiments below. Further, the embodiments below are provided to more fully describe the present invention to those skilled in the art, and detailed explanation of publicly known constitutions which may be determined to unnecessarily obscure the technical point of the present invention may be omitted.

Figure 1:
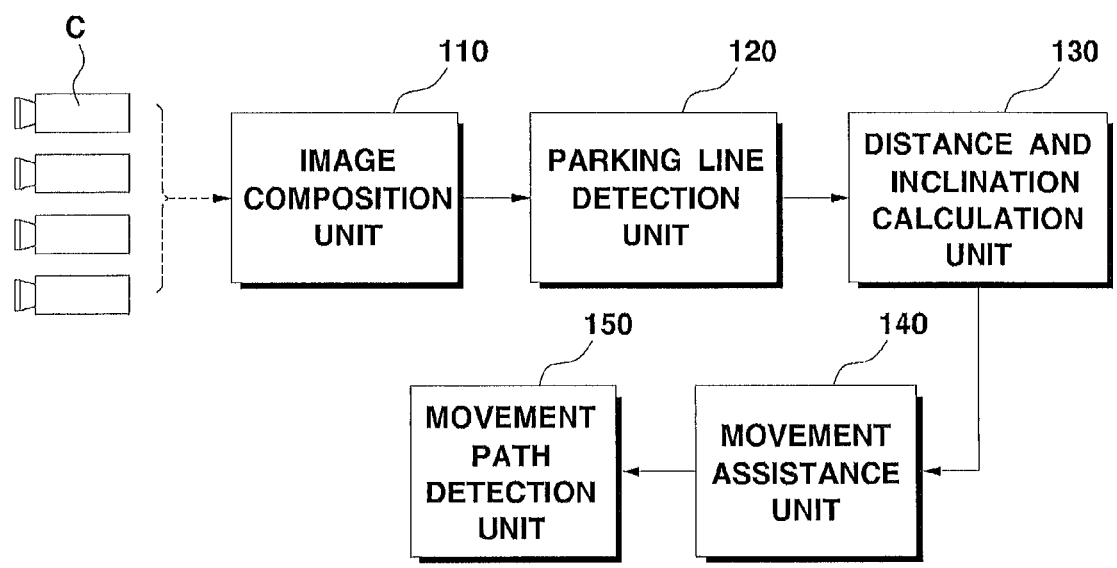
FIG. 1 is a configuration diagram of a vehicle movement assistance system for a vehicle according to an embodiment of the present invention.

FIG. 1 is a configuration diagram of a vehicle movement assistance system for a vehicle according to an embodiment of the present invention.

Referring to FIG. 1, a parking assistance system 100 for a vehicle (or an assistance system) according to an embodiment of the present invention may include an image composition unit 110, a parking line detection unit 120 (or line detection unit), a distance and inclination calculation unit 130, a movement path generation unit 140, and a movement assistance unit 150.

In general, the assistance system 100 according to an embodiment of the present embodiment invention may dispose or guide a vehicle at or to an initial position, at which a parking space may be appropriately recognized, considering an effective detection range or detection accuracy of a camera, an ultrasonic wave sensor, and the like. That is, the assistance system 100 according to the present embodiment may move and assist a position or a posture of the vehicle from an initial stage, at which the recognition of the parking space begins, thereby more accurately recognizing the parking space and improving user convenience.

The image composition unit 110 may obtain an image signal from a camera C, and generate a composed image in a form of a top view or an around view through the obtained image signal. The composed image in the form of the top view or the around view may mean a plane image of front, rear, left, and right sides of the vehicle which are viewed from a predetermined position of an upper side of the vehicle. The generation of the composed image has been known in the name of an around view monitoring system in the business field in the art.

The line detection unit 120 may detect a line marked on the street through the compose image generated by the image composition unit 110. That is, the line detection unit 120 detects an interested line from the composed image through an image processing process.

Figure 2:
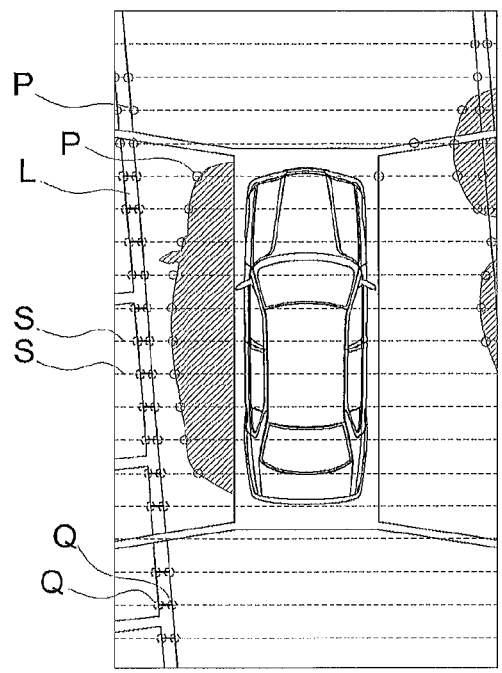
FIG. 2 is a diagram illustrating an example of a process of detecting a line marked on the street.
Figure 2:
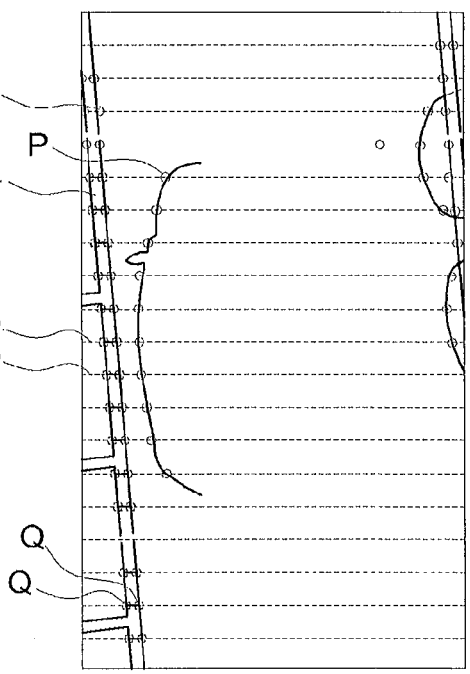
Figure 2:
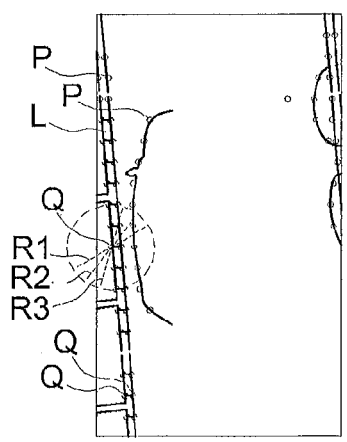
Figure 2:
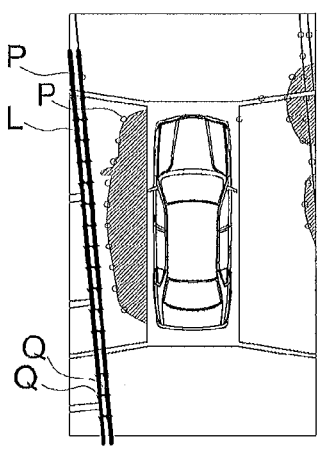
Figure 2:
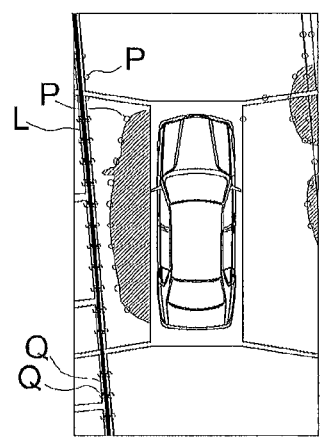

FIG. 2 is a diagram illustrating an example of a process of detecting a line marked on the street by the line detection unit illustrated in FIG. 1.

For reference, FIGS. 2B and 2C illustrate contour line images of the composed image, and light and shade regions are reversed and illustrated for convenience of description (that is, lines indicated with a black color in FIGS. 2B and 2C are lines indicated to be bright (white) in an actual contour line image, and a background indicated with a white color is a region indicated to be dark (black) in the actual contour line image).

First, referring to FIGS. 2A and 2B, the line detection unit 120 may extract a candidate point Q having a brightness pattern of a line L from the provided composed image.

Particularly, the line detection unit 120 may select a plurality of sections S for searching for characteristic points P in the composed image. Further, the line detection unit 120 may generate a contour line image (see FIG. 2B) from the composed image, and extract the plurality of characteristic points P from the generated contour line image by investigating the contour line image in a horizontal direction for each section S. Points having a relatively high light and shade gradient may be extracted as the respective characteristic points P through the horizontal directional investigation for each section S.

The line detection unit 120 may select some characteristic points P having the brightness pattern of the line L among the plurality of characteristic points P, and generate a combination of the candidate points Q of the line L. Since the line L is generally displayed by a bright color, such as a white color or a yellow color, some characteristic points P, which exhibit the brightness pattern in an order of dark, bright, and dark in the horizontal directional investigation for each section S, may be selected as the candidate points Q of the line L.

Referring to FIGS. 2C to 2E, the line detection unit 120 may select or detect a final line L from the plurality of selected candidate points Q through a line fitting process. Particularly, the line detection unit 120 may extract line components R1, R2, and R3 by performing an investigation in a direction of 360° based on the selected candidate points Q. Further, the line detection unit 120 may select or detect a line component, which passes through the plurality of candidate points Q, among the extracted line components R1, R2, and R3 as the final line L as illustrated in FIG. 2E.

Referring back to FIG. 1, the distance and inclination calculation unit 130 may calculate a distance between the vehicle and the line and an inclination (slope) between the vehicle and the line for the line detected by the line detection unit 120.

Figure 3:
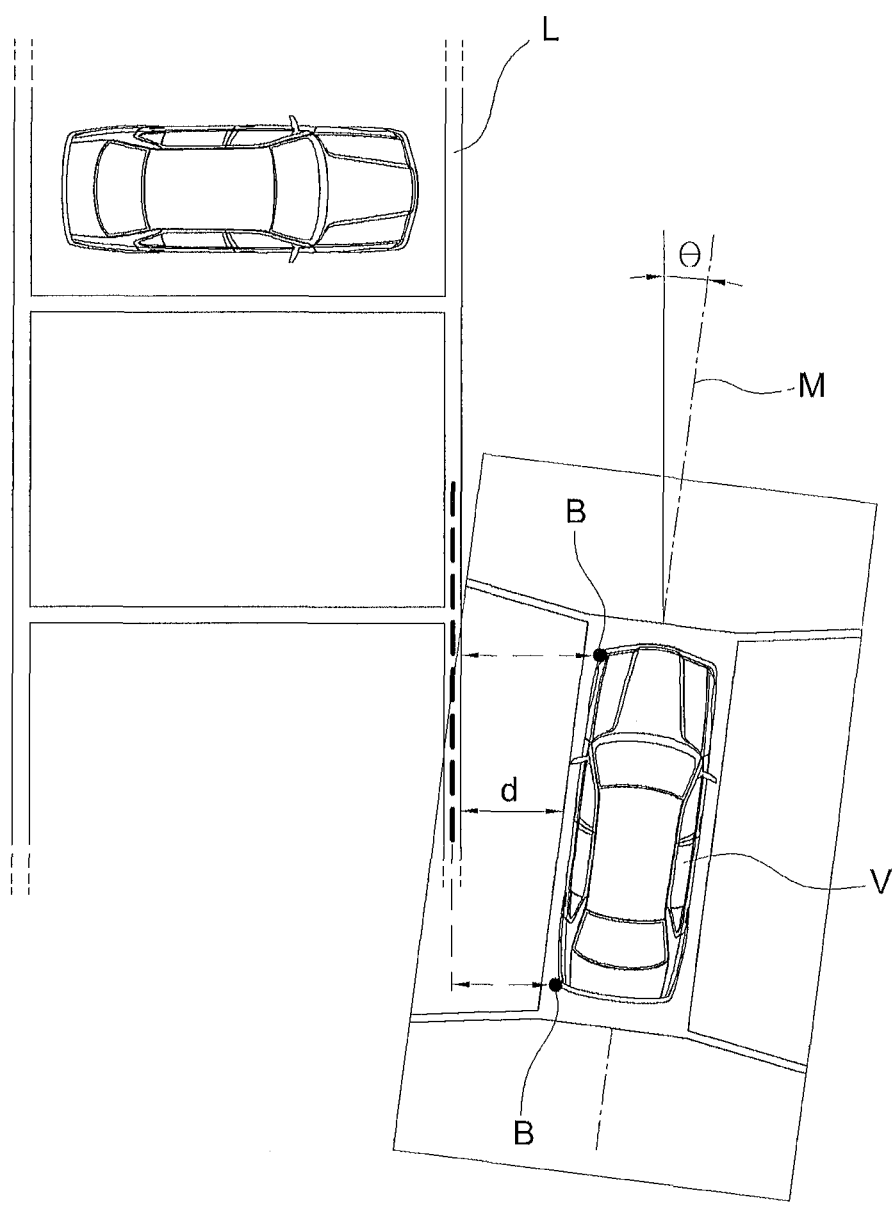
FIG. 3 is a diagram illustrating an example of a method of calculating a distance and an inclination between a line marked on the street and a vehicle by a distance and inclination calculation unit illustrated in FIG. 1.

FIG. 3 is a diagram illustrating an example of a method of calculating a distance and an inclination between a line marked on the street and a vehicle by the distance and inclination calculation unit illustrated in FIG. 1.

Referring to FIG. 3, the distance and inclination calculation unit 130 may calculate a distance d between the detected line L and a vehicle V. For example, the distance and inclination calculation unit 130 may calculate the distance d between the line L and the vehicle V in an image coordinate system based on the composed image and the detected line L, and calculate the distance d between the line L and the vehicle V by a method of converting the distance d in the image coordinate system into a distance in a world coordinate system.

The distance and inclination calculation unit 130 may calculate the distances d between the vehicle V and the line L at a plurality of points as necessary. In this case, each point for calculating the distance d may be set considering a mounting position of an ultrasonic wave sensor B of the vehicle V. For example, when the ultrasonic wave sensors B are mounted at front and rear sides of the vehicle, respectively, as illustrated in FIG. 3, the distance and inclination calculation unit 130 may calculate the distance d between the vehicle V and the line L at the point at which each of the ultrasonic wave sensors B is mounted. Otherwise, although not illustrated, each point for calculating the distance d may be set considering a position of mounting a camera to the vehicle V. This is for the purpose of disposing the vehicle V at an initial position, at which each ultrasonic wave sensor B or the camera may appropriately recognize the parking space and the like, during the assistance or guide through the ultrasonic wave sensor B or the camera.

In the meantime, the distance and inclination calculation unit 130 may calculate an inclination θ between the detected line L and the vehicle V. The inclination θ may be calculated by an angle between a longitudinal center axis M of the vehicle V and the detected line L.

Referring back to FIG. 1, the movement path generation unit 140 may generate a movement path for disposing the vehicle at the appropriate initial position based on the line detected through the line detection unit 120, and the distance and the inclination calculated by the distance and inclination calculation unit 130.

In this case, the movement path generation unit 140 may generate the movement path of the vehicle under a condition that the distance between the vehicle and the line marked on the street approaches a predetermined distance, and the inclination between the vehicle and the line is 0° (or the vehicle is parallel to the line). Further, a position, at which the appropriate parking space may be recognized considering the effective detection range or the detection accuracy of the camera, the ultrasonic wave sensor, and the like, may be set as the initial position.

Figure 4:
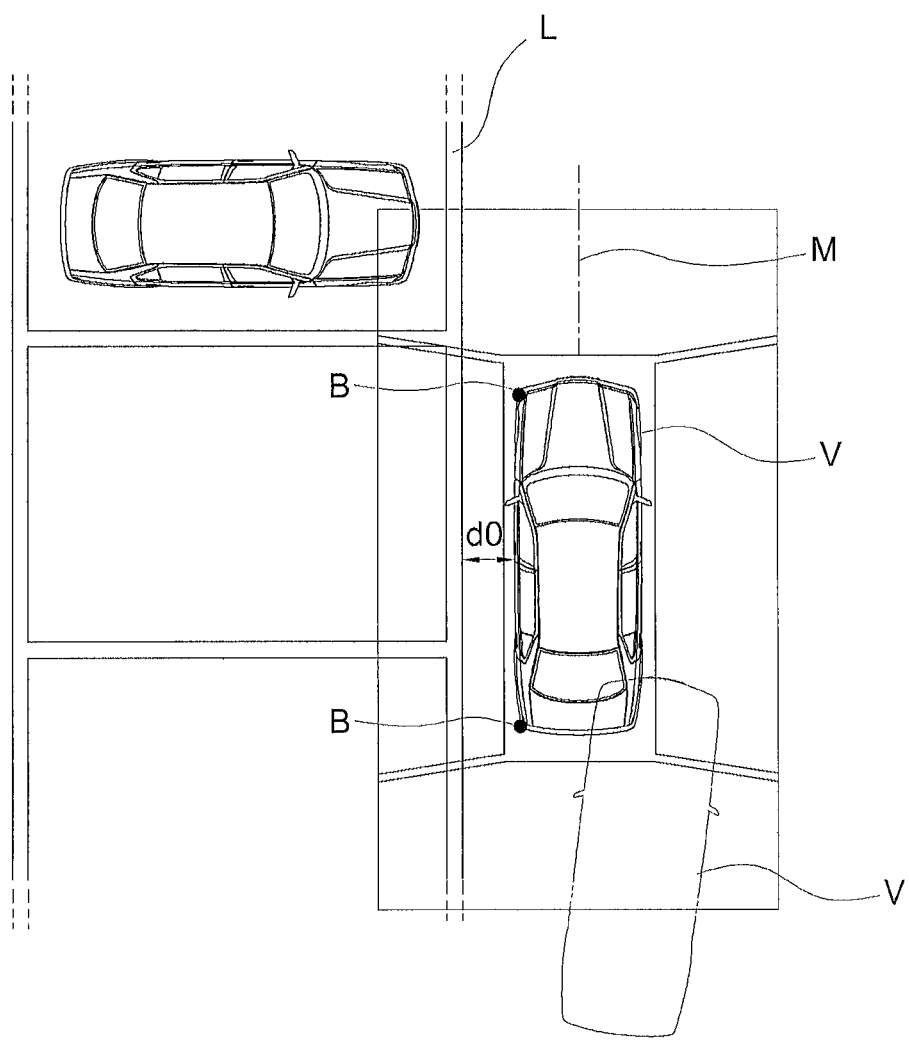
FIG. 4 is a diagram illustrating an example of a method of generating a movement path by a movement path generating unit illustrated in FIG. 1.

FIG. 4 is a diagram illustrating an example of a method of generating a movement path by the movement path generating unit illustrated in FIG. 1.

Referring to FIG. 4, the movement path generation unit 140 may generate a movement path of the vehicle V so that the distance d between the vehicle V and the line L approaches a predetermined distance d0. In this case, the predetermined distance d0 may be set considering the effective detection range or the detection accuracy of the ultrasonic wave sensor B or the camera (not illustrated) mounted in the vehicle V.

The movement path generation unit 140 may generate the movement path of the vehicle V so that the inclination θ between the longitudinal center axis M of the vehicle V and the line L is 0°. That is, the movement path generation unit 140 may generate the movement path of the vehicle V so that the vehicle V and the line L are disposed in a parallel.

As a result, the movement path generation unit 140 may generate the movement path for disposing the vehicle V at the initial position. A position, a t which the ultrasonic wave sensor B or the camera mounted in the vehicle V may detect the parking space and the like within the effective detection range or with the detection accuracy of a reference level or higher may be set as the initial position.

In the meantime, the movement path is generated based on a forward movement of the vehicle V in FIG. 4, but is not essentially limited thereto, and the movement path generation unit 140 may also generate the movement path based on a reverse movement of the vehicle V as necessary.

Referring back to FIG. 1, the movement assistance unit 150 assists the movement of the vehicle according along the movement path generated by the movement path generation unit 140. That is, the movement assistance unit 150 may control driving of the steering wheel so that the vehicle may be disposed at the aforementioned initial position according along the generated movement path. Otherwise, the movement assistance unit 150 may guide the movement path of the vehicle to the user through an audio-visual means, such as a voice and a guide message, as necessary, and assist the operation of the steering wheel so that the vehicle may be disposed at the appropriate initial position.

In the meantime, the vehicle may be moved to the aforementioned initial position by the movement assistance unit 150, and after the vehicle is moved to the initial position, the parking space may be recognized and the parking may be guided through the ultrasonic wave sensor or the camera. The aforementioned process may be performed by the assistance system based on the ultrasonic wave sensor or the assistance system based on an image, which are publicly known in the related art. However, the assistance system 100 according to the present embodiment may guide the vehicle to the appropriate initial position from an initial state before recognizing the parking space, to more reliably recognize the parking space and guide the parking, which thus may be distinguished from the assistance system publicly known in the related art.

To additionally describe the system, the general assistance system in the related art, the recognition of the parking space and the guide for the parking begins in a state where the user directly drives the vehicle to the vicinity of the line or directly disposes the vehicle at the vicinity of the line. In this case, the initial position of the vehicle, at which the recognition of the parking space, and the like begins, totally depends on the operation of the user. Accordingly, the system operation may be initiated in a state where the line and the vehicle are spaced apart from each other by a predetermined interval or more, or the vehicle is misaligned to the line, and this may cause deviation from the effective detection range of the ultrasonic wave sensor or the camera or deterioration in the detection accuracy. Particularly, a user, which is not accustomed to use the system, may have difficulty in disposing the vehicle at an appropriate interval or in a posture for operating the system, and this causes inconvenience in use.

In the meantime, the assistance system 100 according to the present embodiment may guide and dispose the vehicle at the appropriate initial position when the vehicle is moved to the vicinity of the line, thereby more smoothly recognizing the parking space or guiding the parking, and promoting convenience of the user.

Figure 5:
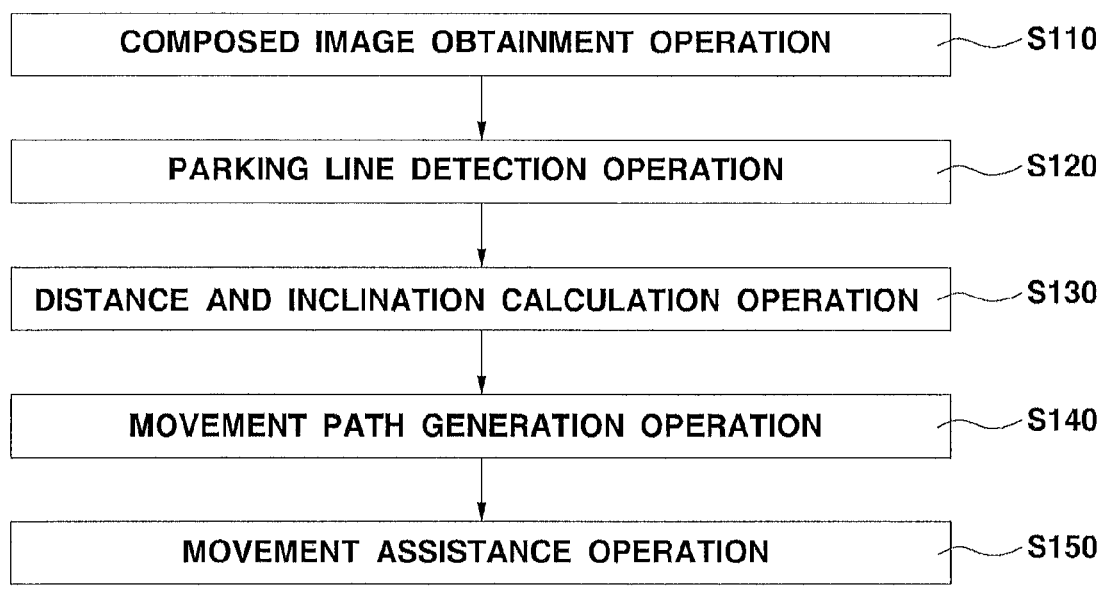
FIG. 5 is a flowchart illustrating a vehicle movement assistance method for a vehicle according to an embodiment of the present invention.

FIG. 5 is a flowchart illustrating a vehicle movement assistance method for a vehicle according to an embodiment of the present invention.

The vehicle movement assistance method for a vehicle according to the present embodiment (hereinafter, referred to as the "assistance method") may be implemented by the assistance system 100 according to the aforementioned embodiment.

Referring to FIG. 5, the assistance method for a vehicle according to the present embodiment may include a composed image obtainment operation S110, a line detection operation S120, a distance and inclination calculation operation S130, a movement path generation operation S140, and a movement assistance operation S150.

In the composed image obtainment operation S110, a composed image in a form of a top view or an around view may be generated by composing front, rear, left, and right images of the vehicle obtained from the camera. The composed image obtainment operation S110 may be implemented by the aforementioned image composition unit 110.

In the line detection operation S120, a line may be detected based on the generated composed image. The detection of the line may be implemented by extracting candidate points having a brightness pattern of the line from the composed image, and performing a line fitting process. The detection of the line may be implemented by the aforementioned line detection unit 120, and the detailed process of detecting the line may be performed similarly to the process aforementioned with reference to FIG. 2.

In the meantime, in the distance and inclination calculation operation S130, a distance and an inclination between the vehicle and the line may be calculated for the detected line. The distance and the inclination may be calculated through a process of calculating a distance and an inclination in an image coordinate system and then converting the calculated distance and inclination in the image coordinate system to a distance and an inclination in a world coordinate system. The calculation of the distance and the inclination may be implemented by the distance and inclination calculation unit 130 aforementioned with reference to FIG. 3.

In the movement path generation operation S140, a movement path for disposing the vehicle to an initial position may be generated. In this case, the initial position may be set considering an effective detection range or detection accuracy of the ultrasonic wave sensor or the camera mounted in the vehicle. Further, the movement path may be set under the condition that a longitudinal center axis of the vehicle is disposed to be parallel to the line, and a distance between the vehicle and the line approach a predetermined distance. The movement path generation operation S140 may be implemented by the movement path generation unit 140 aforementioned with reference to FIG. 4.

In the movement assistance operation 150, a process of disposing the vehicle to the initial position according along the generated movement path may be performed. The movement assistance operation S150 may be performed by a method of automatically controlling the steering wheel along the generated movement path, or a method of guiding a user operation of the steering wheel by an audio-visual method, and may be implemented by the aforementioned movement assistance unit 150.

As described above, according to the assistance system and method according to the embodiments of the present invention, the vehicle may be moved to and disposed at a predetermined initial position considering an effective detection range or detection accuracy of the ultrasonic wave sensor and the like. Accordingly, it is possible to more accurately and reliably recognize a parking space. Further, the assistance system and method according to the embodiments of the present invention may automatically control a movement of the vehicle or guide the movement of the vehicle to a user from an initial stage before recognizing the parking space, thereby enabling the user to more easily and conveniently receive assistance or guide.

As described above, embodiments of the present invention have been described, but it will be appreciated by those skilled in the art that the present invention may be modified and changed in various ways without departing from the spirit of the present invention described in the claims by the addition, change, or deletion of constituent elements, and that the modifications and changes are included in the claims of the present invention.

What is claimed is:

1. A vehicle movement path system for a vehicle, the system comprising:
    a camera input configured to receive at least one photographic image from a camera installed in the vehicle;
    at least one module configured:
        to analyze the at least one photographic image to identify a line marked on a road,
        to compute an angle between the line and an axis of the vehicle,
        to compute a distance between the line and a point associated with the vehicle, and
        to generate, using the computed angle and the computed distance, a movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween; and
    a movement path output port configured to output the movement path to the vehicle such that the vehicle automatically steers itself using the movement path or provides a driver with guidance to move the vehicle along the movement path.

2. The system of claim 1,
    wherein the axis is a longitudinal axis of the vehicle, and
    wherein the predetermined target angle is zero.

3. The system of claim 2, wherein the at least one module is further configured
- to recognize space from at least one surrounding obstacle and
- to generate the movement path in view of the recognized space.

4. The system of claim 2, further comprising a sensor input configured to receive ultrasonic wave signals, wherein the at least one module is further configured to recognize space from at least one surrounding obstacle based on the ultrasonic wave signals.

5. The system of claim 1, wherein the point associated with the vehicle is on a side of the vehicle facing the line marked on the road.

6. The system of claim 1,
- wherein the axis is a longitudinal axis of the vehicle, and
- wherein the point associated with the vehicle is located generally in the middle along the axis.

7. The system of claim 1, wherein the vehicle movement path system is configured to identify the line by a method comprising:
- synthesizing a view using the at least one photographic image;
- processing the view to locate a plurality of candidate points on the view; and
- conducting a line fitting process for at least part of the plurality of candidate points to identify the line.

8. A vehicle comprising:
- at least one camera installed in the vehicle and configured to capture at least one photographic image of surroundings of the vehicle; and
- the vehicle movement path system of installed in the vehicle, the vehicle movement path system comprising:
  - a camera input configured to receive the at least one photographic image from the at least one camera installed in the vehicle;
  - at least one module configured:
    - to analyze the at least one photographic image to identify a line marked on a road,
    - to compute an angle between the line and an axis of the vehicle,
    - to compute a distance between the line and a point associated with the vehicle, and
    - to generate, using the computed angle and the computed distance, the movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween; and
  - a movement path output port configured to output the movement path to the vehicle such that the vehicle automatically steers itself using the movement path or provides a driver with guidance to move the vehicle along the movement path.

9. The vehicle of claim 8, wherein the vehicle is configured to automatically steer itself using the movement path.

10. The vehicle of claim 8, wherein the vehicle is configured to provide driving guidance to a driver in accordance with the movement path.

11. The vehicle of claim 8,
- wherein the axis is a longitudinal axis of the vehicle, and
- wherein the predetermined target angle is zero.

12. The vehicle of claim 8, wherein the point associated with the vehicle is on a side of the vehicle facing the line marked on the road.

13. The vehicle of claim 8,
- wherein the axis is a longitudinal axis of the vehicle, and
- wherein the point associated with the vehicle is located generally in the middle along the axis.

14. The vehicle of claim 8, wherein the vehicle movement path system is configured to identify the line by a method comprising:
- synthesizing a view using the at least one photographic image;
- processing the view to locate a plurality of candidate points on the view; and
- conducting a line fitting process for at least part of the plurality of candidate points to identify the line.

15. The vehicle of claim 14,
- wherein processing the view comprises segmenting the view into a plurality of segments, and
- wherein the line fitting process is to identify the line based on a brightness pattern.

16. The vehicle of claim 8, wherein the vehicle movement path system further comprises an ultrasonic wave sensor.

17. A method of moving a vehicle comprising:
- providing a vehicle comprising:
  - at least one camera installed in the vehicle and configured to capture at least one photographic image of surroundings of the vehicle; and
  - a vehicle movement path system installed in the vehicle, the vehicle movement path system comprising
    - a camera input,
    - at least one module, and
    - a movement path output port,
  - wherein the camera input is configured to receive the at least one photographic image from the at least one camera installed in the vehicle,
  - wherein the at least one module is configured
    - to analyze the at least one photographic image to identify a line marked on a road,
    - to compute an angle between the line and an axis of the vehicle,
    - to compute a distance between the line and a point associated with the vehicle, and
    - to generate, using the computed angle and the computed distance, the movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween,
  - wherein the movement path output port is configured to output the movement path to the vehicle such that the vehicle automatically steers itself using the movement path or provides a driver with guidance to move the vehicle along the movement path;
- running the vehicle movement path system, which performs:
  - analyzing the at least one photographic image to identify a first line marked on a first road,
  - computing a first angle between the first line and a first axis of the vehicle,
  - computing a first distance between the first line and a first point associated with the vehicle,
  - generating, using the computed first angle and the computed first distance, a first movement path along which to move the vehicle such that the vehicle proceeds toward a first position at which the vehicle is spaced apart from the first line by the predetermined target distance and further such that the vehicle turns toward a first orientation at which the first axis of the vehicle and the first line form the predetermined target angle therebetween, and outputting the first movement path to the vehicle; and moving the vehicle in accordance with the first movement path.

18. The method of claim 17, wherein the vehicle automatically steers itself using the first movement path.

19. The method of claim 17, wherein the vehicle provides a driver with guidance to move the vehicle along the first movement path.

20. The method of claim 17,
wherein the first axis is a longitudinal axis of the vehicle, wherein the predetermined target angle is zero,
wherein the first point associated with the vehicle is on a side of the vehicle facing the first line marked on the road, and
wherein the first point associated with the vehicle is located generally in the middle along the first axis.

21. A method of generating a vehicle movement path, the method comprising:
providing a vehicle movement path system installed in a vehicle,
the vehicle movement path system comprising
a camera input,
at least one module, and
a movement path output port,
wherein the camera input is configured to receive at least one photographic image from at least one camera installed in the vehicle,
wherein the at least one module is configured
to analyze the at least one photographic image to identify a line marked on a road,
to compute an angle between the line and an axis of the vehicle, to compute a distance between the line and a point associated with the vehicle, and
to generate, using the computed angle and the computed distance, the movement path along which to move the vehicle such that the vehicle proceeds toward a position at which the vehicle is spaced apart from the line by a predetermined target distance and further such that the vehicle turns toward an orientation at which the axis of the vehicle and the line form a predetermined target angle therebetween,
wherein the movement path output port is configured to output the movement path to the vehicle such that the vehicle automatically steers itself using the movement path or provides a driver with guidance to move the vehicle along the movement path;

analyzing the at least one photographic image to identify a first line marked on a road;

computing a first angle between the first line and a first axis of the vehicle;

computing a first distance between the first line and a first point associated with the vehicle;

generating, using the computed first angle and the computed first distance, a first movement path along which to move the vehicle such that the vehicle proceeds toward a first position at which the vehicle is spaced apart from the first line by the predetermined target distance and further such that the vehicle turns toward ma-a first orientation at which the first axis of the vehicle and the first line form the predetermined target angle therebetween; and outputting the first movement path to the vehicle such that the vehicle automatically steers itself using the first movement path or provides a first driver with guidance to move the vehicle along the first movement path.

22. The method of claim 21,
wherein the first axis is a longitudinal axis of the vehicle, wherein the predetermined target angle is zero,
wherein the first point associated with the vehicle is on a side of the vehicle facing the first line marked on the road, and
wherein the first point associated with the vehicle is located generally in the middle along the first axis.

* * * * *